(12) United States Patent
Sano

(10) Patent No.: US 10,257,153 B2
(45) Date of Patent: Apr. 9, 2019

(54) COMMUNICATION APPARATUS, CONTROL METHOD, AND STORAGE MEDIUM

(71) Applicant: CANON KABUSHIKI KAISHA, Tokyo (JP)

(72) Inventor: Kensuke Sano, Shiroi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 14/677,072

(22) Filed: Apr. 2, 2015

(65) Prior Publication Data
US 2015/0295887 A1 Oct. 15, 2015

(30) Foreign Application Priority Data
Apr. 9, 2014 (JP) .................. 2014-080493

(51) Int. Cl.
H04L 29/12 (2006.01)
(52) U.S. Cl.
CPC ...... *H04L 61/1511* (2013.01); *H04L 61/6009* (2013.01)
(58) Field of Classification Search
CPC .................. H04L 61/6004; H04L 61/1511
See application file for complete search history.

(56) References Cited

U.S. PATENT DOCUMENTS

| 7,757,287 B2 * | 7/2010 | Gassoway | G06F 21/564 |
| | | | 713/188 |
| 8,775,604 B2 * | 7/2014 | Levow | H04L 12/585 |
| | | | 709/206 |
| 2007/0081530 A1 * | 4/2007 | Nomura | H04L 12/185 |
| | | | 370/389 |
| 2007/0168560 A1 * | 7/2007 | Alkire | H04L 29/12009 |
| | | | 709/247 |
| 2010/0023611 A1 * | 1/2010 | Yang | H04L 29/12066 |
| | | | 709/223 |
| 2011/0145435 A1 * | 6/2011 | Bhatawdekar | G06F 21/566 |
| | | | 709/238 |
| 2012/0072407 A1 * | 3/2012 | Shyamsunder | H04L 29/12632 |
| | | | 707/709 |

(Continued)

FOREIGN PATENT DOCUMENTS

| JP | 2007-214671 A | 8/2007 |
| JP | 2011-176468 A | 9/2011 |
| WO | 2012/094675 A2 | 7/2012 |

OTHER PUBLICATIONS

Microsoft, Nov. 3, 2005, "Configuring IP Addressing and Name Resolution" Retrieved on Dec. 11, 2016 from <https://technet.microsoft.com/en-us/library/bb457118.aspx>.*

(Continued)

*Primary Examiner* — Arvin Eskandarnia
*Assistant Examiner* — Juan C Turriate Gastulo
(74) *Attorney, Agent, or Firm* — Carter, DeLuca & Farrell LLP

(57) ABSTRACT

A communication apparatus: designates a name in a network and requests name resolution for the name; receives a response to the request; and stores the name and information included in the response and relating to the name in a case where the name has a length not greater than a predetermined length, and does not store the name and the information in a case where the name has a length greater than the predetermined length.

10 Claims, 5 Drawing Sheets

(56) References Cited

U.S. PATENT DOCUMENTS

| | | | |
|---|---|---|---|
| 2012/0179730 A1* | 7/2012 | Slegers | G06F 17/30227 707/822 |
| 2012/0254533 A1* | 10/2012 | Jibbe | G06F 12/0868 711/114 |
| 2014/0059208 A1* | 2/2014 | Yan | H04L 43/0817 709/224 |
| 2015/0058488 A1* | 2/2015 | Backholm | H04L 61/1511 709/226 |

OTHER PUBLICATIONS

RFC 1035 Domain Names—Implementation and Specification (URL: http://www.ietf.org/rfc/rfc1035.txt).

Japanese Office Action dated Jan. 29, 2018 corresponding to Japanese Application No. 2014080493, 2 pages.

* cited by examiner

FIG. 3

| DOMAIN NAME | IP ADDRESS |
|---|---|
| aa.com | 1.1.1.1 |
| bb.com | 1.1.1.2 |
| c.co.jp | 1.1.1.3 |
|  |  |

FIG. 4

| HASH VALUE | NUMBER OF REQUESTS |
|---|---|
| 1 | 70 |
| 2 | 102 |
| 3 | 3 |
|  |  |

COMMUNICATION APPARATUS, CONTROL METHOD, AND STORAGE MEDIUM

BACKGROUND OF THE INVENTION

Field of the Invention

The present invention relates to name resolution in a network.

Description of the Related Art

A large number of communication terminals have TCP/IP communication function in recent years. For communication between these communication terminals, an individual IP address needs to be assigned to each terminal, in order to identify the other apparatus in communication on a network. On the other hand, for the convenience of users of communication terminals, for example, not an IP address but a domain name corresponding to the IP address is often used to specify the other apparatus in communication. In the case of using the domain name, the IP address corresponding to the domain name is specified by name resolution according to the Domain Name System (DNS) and used for communication.

A communication terminal can cache (temporarily store) an IP address obtained as a result of designating a domain name and requesting name resolution, in association with the corresponding domain name (see RFC 1035 DOMAIN NAMES—IMPLEMENTATION AND SPECIFICATION (URL: http://www.ietf.org/rfc/rfc1035.txt)). This cache function saves the need for the communication terminal to repeat a name resolution request for the same domain name, and shortens the response time of name resolution or reduces network traffic.

A certain amount of memory needs to be reserved to cache a name resolution result. In an embedded device where resources such as memory are limited, dynamically reserving the memory for the cache may cause an increase in processing load or a lack of available resources for other applications. Accordingly, a preset size of memory is often reserved to cache name resolution results. The size of memory needed to cache domain names is "(the maximum domain name length (255 characters))×(the number of domain names allowed to be stored)". Actually, however, not many domain names have 255 characters. There is thus a problem in that memory resources are wasted in an embedded device which operates with limited memory.

The present invention has been made in view of the problem stated above, and provides a technique for preventing waste of storage space in temporary storage of name resolution results.

SUMMARY OF THE INVENTION

According to one aspect of the present invention, there is provided a communication apparatus comprising: a request unit configured to designate a name in a network and request name resolution, to a name resolution unit; a reception unit configured to receive a response to the request; and a storage unit configured to store the name and information included in the response and relating to the name in a case where the name has a length not greater than a predetermined length, and not to store the name and the information in a case where the name has a length greater than the predetermined length.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a schematic diagram showing content stored in a cache.

FIG. 4 is a diagram showing a table for managing the number of name resolution requests.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

The embodiment described below is merely illustrative of the present invention, and the present invention is not limited to the embodiment. Moreover, not all of the combination of features described in the embodiment are necessarily required for the present invention.

Structure of Network System

Figure 1:
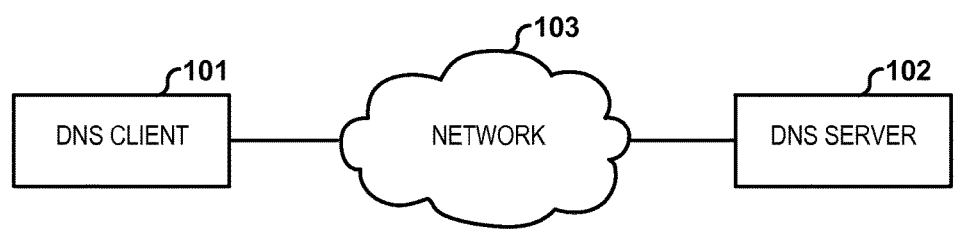
FIG. 1 is a diagram showing the structure of a network system.

FIG. 1 is a diagram showing an example of the structure of a network system according to this embodiment. The network system according to this embodiment constitutes the Domain Name System for performing name resolution on the domain names of devices connected to a network or the like, and includes, for example, a DNS client 101 which is a communication apparatus and a DNS server 102 which may be a communication partner apparatus of the DNS client 101. The DNS client 101 communicates with the DNS server via a network 103.

The DNS client 101 designates a name (domain name) and requests name resolution for the name, to the DNS server 102. For example, the DNS client 101 designates a domain name "aa.com" and requests name resolution, to the DNS server 102. In response to this request, the DNS server transmits, for example, information including an IP address such as "1.1.1.1" registered in a database in association with the designated domain name, to the DNS client 101. The DNS client 101 receives the information including the IP address "1.1.1.1" corresponding to the designated "aa.com", and thus can access a device having the IP address.

The DNS client 101 according to this embodiment can temporarily store (cache) the domain name for which the name resolution is requested and the response from the DNS server 102 to the request, i.e. the IP address, in RAM or the like in the DNS client 101 in association with each other. This saves the need to repeat name resolution on the domain name that has been resolved once, and so increases the speed of connection to the device corresponding to the domain name.

In the case of reserving a storage area for caching domain names and IP addresses beforehand, a storage area of a size equivalent to the result of multiplying the maximum domain name length (255 characters) by the number of domain names allowed to be stored is reserved, as mentioned earlier. However, the frequency at which a domain name is as long as 255 characters is not high. There is thus a problem in that a large storage area is reserved without being used because of such an infrequent event.

In view of this, in the case where the domain name is not greater than a predetermined length, the DNS client 101 according to this embodiment stores the domain name and the IP address included in the response from the DNS server 102, in association with each other. In other words, in the case where the domain name is greater than the predetermined length, the DNS client 101 basically does not store the domain name. For example, suppose the predetermined length is 20 characters. Then, a storage area equivalent to the result of multiplying 235 (=255−20) characters by the number of domain names allowed to be stored can be saved.

However, regarding a frequently accessed domain as an example, if its domain name is not cached simply because it is greater than the predetermined length, the DNS client 101 needs to access the DNS server 102 upon each access to the domain. To avoid this, the DNS client 101 may store the domain name of such a domain. In this case, the DNS client 101 stores, for each domain name greater than the predetermined length, the number of times the name resolution has been performed. In the case where the number of times the name resolution has been performed exceeds a predetermined number, the DNS client 101 caches the domain name and the IP address received as the response. Since a frequently used domain name is cached regardless of its length in this way, the DNS client 101 does not need to make a name resolution request to the DNS server 102.

Likewise, for example in the case where the time required to resolve a domain name greater than the predetermined length exceeds a predetermined time, each repeated name resolution operation for such a domain takes a long time. In view of this, such a domain name is cached regardless of its length, with it being possible to shorten the time required for name resolution. On the other hand, even in the case where the time required for name resolution exceeds the predetermined time, if the domain is rarely accessed, the DNS client 101 may suppress the caching of the domain name. In detail, for example, the DNS client 101 may count the number of name resolution requests issued for the domain name as mentioned above and, in the case where the number is greater than the predetermined number and also the time required for name resolution is greater than the predetermined time, cache the domain name.

Moreover, the DNS client 101 may cache a pre-registered domain name regardless of its length. Thus, for example in the case where it is known beforehand that the DNS client 101 frequently accesses a domain, the DNS client 101 can cache its domain name regardless of the number of name resolution requests or the time required for the process as mentioned above.

A storage area for storing each domain name greater than the predetermined length as mentioned above may be dynamically reserved separately from a storage area for storing each domain name not greater than the predetermined length. Here, a storage unit used for other processes, etc. of the DNS client 101 may be used. This is based on an assumption that, since the frequency at which a domain name is greater than the predetermined length is not high, the above-mentioned dynamic reservation is unlikely to cause an increase in processing load or a lack of area used for other applications in the DNS client 101.

The following describes an example of the structure of the DNS client 101 and an example of the process flow of the DNS client 101 in detail.

Example of Structure of DNS Client

Figure 2:
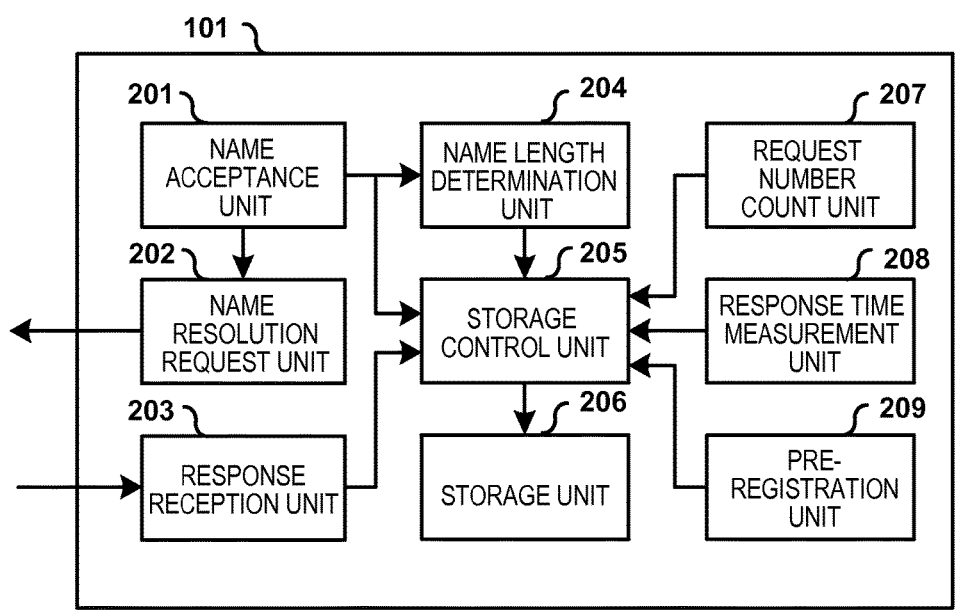
FIG. 2 is a block diagram showing an example of the functional structure of a DNS client.

FIG. 2 is a block diagram showing an example of the functional structure of the DNS client 101 according to this embodiment. The DNS client 101 includes, for example, a name acceptance unit 201, a name resolution request unit 202, a response reception unit 203, a name length determination unit 204, a storage control unit 205, and a storage unit 206. Note that the DNS client 101 may optionally include a request number count unit 207, a response time measurement unit 208, and a pre-registration unit 209.

In the case where the DNS client 101 obtains the domain name of a domain to be accessed, the DNS client 101 first determines whether or not the domain name and its corresponding IP address are stored in the storage unit 206. In the case of determining that the domain name of the domain to be accessed and the IP address are not stored, the DNS client 101 performs a process of storing the domain name and the IP address. The functions shown in FIG. 2 mainly relate to this process. In other words, FIG. 2 does not show functions, etc. relating to a process of accessing the domain using the stored IP address, which is performed in the case where the domain name of the domain to be accessed and the IP address are stored or after the name resolution is completed. Thus, the communication apparatus which is the DNS client 101 according to this embodiment has not only the functions shown in FIG. 2 but also the functions of a typical DNS client and communication apparatus. The communication apparatus which is the DNS client 101 may also have other functions such as a function of executing an application as an embedded device.

The name acceptance unit 201 accepts the domain name of the domain to be accessed. For example, the name acceptance unit 201 accepts operation input of the domain name from the user of the DNS client 101 (communication apparatus), or accepts the domain name from an application in the DNS client 101. Note that the name acceptance unit 201 may also have a function of determining whether or not the accepted domain name is already stored in the storage unit 206. In such a case, if the accepted domain name is not stored in the storage unit 206, the name acceptance unit 201 may output the accepted domain name to the name resolution request unit 202, the name length determination unit 204, the storage control unit 205, etc. If the accepted domain name is stored in the storage unit 206, the name acceptance unit 201 may obtain the stored IP address from the storage unit 206 and output the IP address to a functional unit for performing communication in the DNS client 101.

The name resolution request unit 202 designates the domain name and requests name resolution, to the DNS server 102. For example, the name resolution request unit 202 transmits a name resolution packet to the DNS server 102. Note that the response reception unit 203 receives a response to the name resolution request, from the DNS server 102. The response includes information of an IP address corresponding to the domain name designated in the name resolution request. The response reception unit 203 outputs the obtained information of the IP address to the functional unit for performing communication in the DNS client 101, and to the storage control unit 205.

The name length determination unit 204 determines whether or not the domain name accepted by the name acceptance unit 201 is not greater than the predetermined length. The name length determination unit 204 outputs the determination result to the storage control unit 205. For example, suppose the predetermined length is 7 characters. The name length determination unit 204 determines "ddd.com" to be not greater than the predetermined length, as it is 7 characters long. The name length determination unit 204 determines "ddd.co.jp" to be greater than the predetermined length, as it is 9 characters long. The storage control unit 205 causes, according to the determination result of the name length determination unit 204, the storage unit 206 to store the domain name and the IP address included in the response received by the response reception unit 203, in the case where the length of the domain name accepted by the name acceptance unit 201 is not greater than the predetermined length. In the above-mentioned examples, the storage control unit 205 causes the storage unit 206 to store "ddd.com" together with the corresponding IP address, and not to store "ddd.co.jp".

The storage unit 206 stores the domain name not greater than the predetermined length and the corresponding IP address, according to control by the storage control unit 205. For example, domain names and their corresponding IP addresses are stored in the storage unit 206 as shown in FIG. 3. In FIG. 3, the IP address corresponding to the domain name "aa.com" is "1.1.1.1". Likewise, the IP addresses corresponding to "bb.com" and "c.co.jp" are respectively "1.1.1.2" and "1.1.1.3". By referencing to this storage unit 206, the communication apparatus having the function of the DNS client 101 can obtain an IP address corresponding to a previously resolved domain name, and omit repeated name resolution.

Even in the case where the length of the domain name is greater than the predetermined length, the storage control unit 205 may cause the storage unit 206 to store the domain name and the corresponding IP address. For example, in the case where the number of times the name resolution has been performed for one domain, which is counted by the request number count unit 207, is greater than the predetermined number, the storage control unit 205 may cause the storage unit 206 to store information about the domain. Note that the predetermined number may be held in the request number count unit 207, and the request number count unit 207 may be configured to inform the storage control unit 205 in the case where the counted number is greater than the predetermined number.

The request number count unit 207 stores the number of times the name resolution has been performed, for each domain name (greater than the predetermined length). Here, if the domain name itself is stored, the storage of the number of times per se can be waste of storage space. Accordingly, the request number count unit 207 stores the number of name resolution requests for the domain name by using, instead of the domain name, a hash value generated using the domain name as a key. As shown in FIG. 4 as an example, the request number count unit 207 holds the domain name for which the number of name resolution requests is counted in the form of being shortened using a hash value, in association with the number of name resolution requests corresponding thereto. Although the hash value is used here, any value is applicable so long as the domain name can be shortened and the correspondence between the domain and the value can be identified.

Moreover, in the case where the time from when the name resolution is requested for a domain to when a response to the request is received, which is measured by the response time measurement unit 208, is greater than the predetermined time, the storage control unit 205 may cause the storage unit 206 to store information about the domain. Here, the response time measurement unit 208 may hold information of the predetermined time. In detail, the response time measurement unit 208 may be configured to inform the storage control unit 205 in the case where the time from when a request is issued for a domain to when a response is received is greater than the held predetermined time. Note that the response time measurement unit 208 measures, for example, the time from when the name resolution request unit 202 transmits a name resolution packet to when the response reception unit 203 receives a response to the packet.

Regarding a domain name pre-registered in the pre-registration unit 209, the storage control unit 205 may cause the storage unit 206 to store information about the domain even when the length of the domain name is greater than the predetermined length. Note that the pre-registration of the domain name may be made in various situations, such as before shipment of the communication apparatus having the function of the DNS client 101 and in the case where the name acceptance unit 201 accepts a special instruction from the user.

Note that in the storage unit 206, for instance, a storage area of a size equivalent to the result of multiplying the predetermined length as a reference domain name length by the number of domain names allowed to be stored is reserved beforehand for domain name storage. For example, suppose the predetermined length is 7 characters, and the number of domains allowed to be stored is 100. Then, a storage area for 700 characters is reserved beforehand. For each domain whose domain name greater than the predetermined length, on the other hand, a storage area different from the storage area in which each domain name not greater than the predetermined length is stored may be dynamically reserved in the storage unit 206. In other words, each domain whose domain name is not greater than the predetermined length and each domain whose domain name is greater than the predetermined length may be stored in different storage areas in the storage unit 206. Alternatively, a storage area for storing each domain name greater than the predetermined length may be prepared statically. As an example, in addition to the storage area of the size "(the predetermined length)× (the number of domain names allowed to be stored)" for storing each domain name not greater than the predetermined length, a storage area for storing a predetermined number of 255-character domain names may be prepared beforehand. Even in this case, the effect of reducing waste of storage space can be achieved as compared with the case where all areas for storing domain names are prepared with 255-character size.

Example of Process of DNS Client

Figure 5:
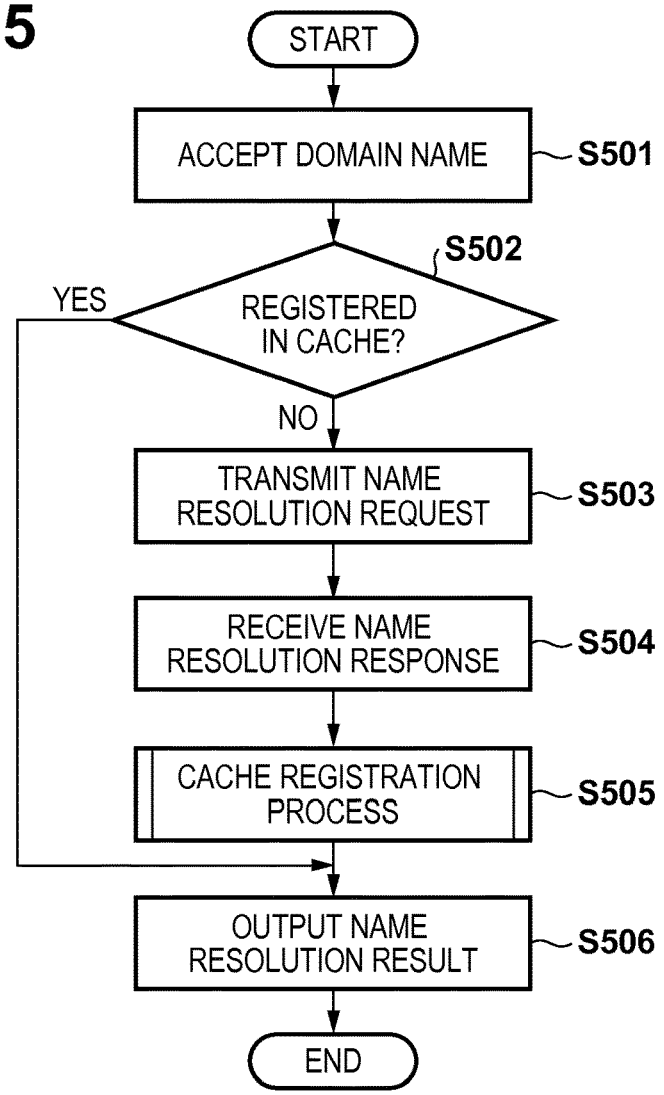
FIG. 5 is a flowchart showing an example of a name resolution process.

The following describes flow of the process executed by the DNS client 101. FIG. 5 is a flowchart showing a name resolution process in the DNS client 101 according to this embodiment.

First, the DNS client 101 accepts the domain name of a domain to be accessed in the name acceptance unit 201 (step S501), and determines whether or not the domain name is cached in the storage unit 206 (step S502). In the case where the accepted domain name is cached (step S502: YES), the DNS client 101 outputs a cached IP address (step S506), and ends the process. Subsequently, the communication apparatus having the function of the DNS client 101 accesses the domain using the output IP address.

In the case where the domain name is not cached (step S502: NO), the DNS client 101 transmits a packet for requesting name resolution in the name resolution request unit 202 (step S503), and receives a response in the response reception unit 203 (step S504). The DNS client 101 performs a cache registration process for the accepted domain name and an IP address included in the response (step S505). The DNS client 101 then outputs the IP address included in the response (step S506), and ends the process. Subsequently, the communication apparatus having the function of the DNS client 101 accesses the domain using the output IP address.

Figure 6:
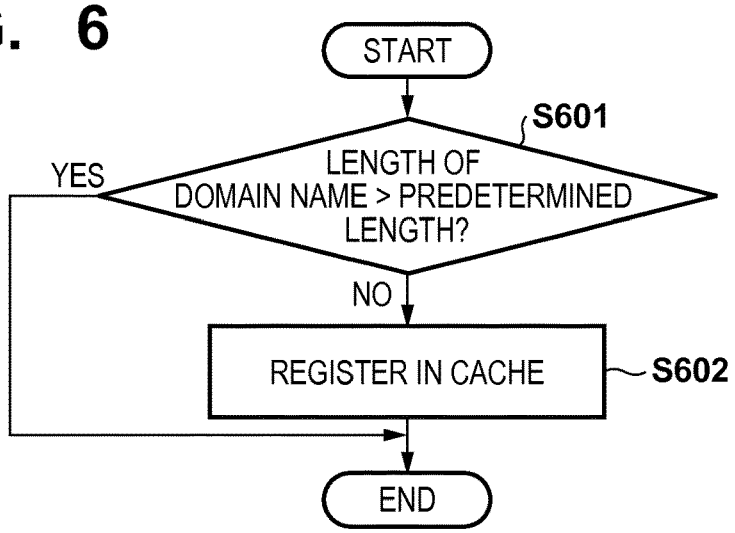
FIG. 6 is a flowchart showing an example of a cache registration process.

An example of the cache registration process is described below, with reference to FIG. 6. This process is executed in the storage control unit 205. The storage control unit 205 determines whether or not the length of the accepted domain name is greater than the predetermined length (step S601). In the case where the length of the accepted domain name is greater than the predetermined length (step S601: YES), the storage control unit 205 ends the process without registering the domain name and the corresponding IP address in the cache. In the case where the length of the accepted domain name is not greater than the predetermined length (step S601: NO), the storage control unit 205 registers the domain name and the corresponding IP address in the cache (step S602). For example, suppose the predetermined length is 7 characters, as mentioned above. In the case where "ddd.com" is accepted as the domain name of the domain to be accessed, the domain name is 7 characters long, i.e. not greater than the predetermined length, so that the storage control unit 205 causes the storage unit 206 to store the domain name together with its corresponding IP address. For example, in the case where the corresponding IP address is "2.2.2.2", the domain name "ddd.com" and the IP address "2.2.2.2" are stored in association with each other, as shown in FIG. 3. In the case where "ddd.co.jp" is accepted as the domain name of the domain to be accessed, on the other hand, the domain name is 9 characters long, i.e. greater than the predetermined length, so that the storage control unit 205 causes the storage unit 206 not to store the domain name.

Figure 7:
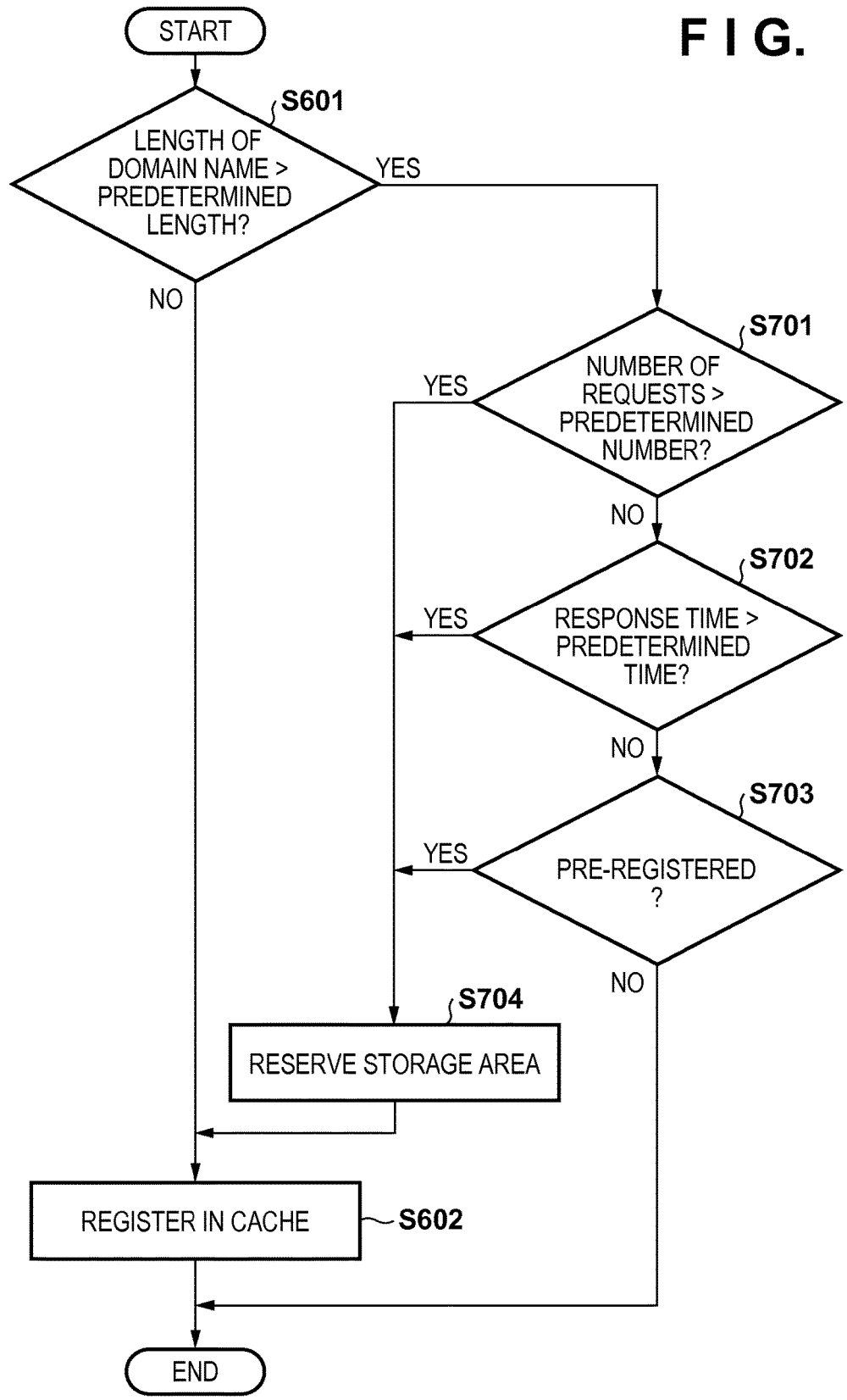
FIG. 7 is a flowchart showing another example of the cache registration process.

Note that even in the case where the domain name is greater than the predetermined length, the domain name may be stored depending on the situation, as mentioned above. FIG. 7 is a flowchart showing an example of the cache registration process executed by the storage control unit 205 in such a case.

In the example shown in FIG. 7, in the case where the length of the accepted domain name is greater than the predetermined length (step S601: YES), the storage control unit 205 determines whether or not the number of name resolution requests issued for the domain name is greater than the predetermined number (step S701). Note that in the case where the request number count unit 207 is configured to inform the storage control unit 205 in the case where the number of requests is greater than the predetermined number, the storage control unit 205 may determine whether or not the information is received. In the case where the number of name resolution requests is greater than the predetermined number (step S701: YES), for example, the storage control unit 205 dynamically reserves a storage area in the storage unit 206 (step S704), and registers the domain name of the domain to be accessed and the corresponding IP address in the cache (step S602).

In the case where the number of name resolution requests is not greater than the predetermined number, on the other hand, the storage control unit 205 determines whether or not the response time from when the name resolution request is issued to when the response is received is greater than the predetermined time (step S702). Note that in the case where the response time measurement unit 208 is configured to inform the storage control unit 205 in the case where the response time is greater than the predetermined time, the storage control unit 205 may determine whether or not the information is received. In the case where the time from the name resolution request to the response is greater than the predetermined time (step S702: YES), the storage control unit 205 dynamically reserves a storage area (step S704), and registers the domain name of the domain to be accessed and the corresponding IP address in the cache (step S602).

In the case where the time from the name resolution request to the response is not greater than the predetermined time (step S702: NO), the storage control unit 205 determines whether or not the domain name of the domain to be accessed is pre-registered in the pre-registration unit 209 (step S703). In the case where the domain name of the domain to be accessed is pre-registered (step S703: YES), the storage control unit 205 dynamically reserves a storage area (step S704), and registers the domain name of the domain to be accessed and the corresponding IP address in the cache (step S602). In the case where the domain name of the domain to be accessed is not pre-registered (step S703: NO), the storage control unit 205 ends the process without registering the domain name and the corresponding IP address in the cache.

Here, only one or two of the processes of steps S701 to S703 in the example in FIG. 7 may be performed, and the processes of steps S701 to S703 may be performed in any order. In detail, only the determination of step S701 may be performed so as not to register the domain name in the cache in the case where the number of name resolution requests is not greater than the predetermined number. Likewise, only the determination of step S702 or only the determination of step S703 may be performed. Alternatively, only the two determinations of steps S701 and S702, steps S701 and S703, or steps S702 and S703 may be performed. Moreover, for example, the determination of step S703 may precede the determinations of steps S701 and S702, and the determination of step S702 may precede the determinations of steps S701 and S703.

The determination of step S702 may be performed in the case where it is determined in step S701 that the number of name resolution requests is greater than the predetermined number. The following process is also possible: the domain name is cached without the determination of step S702 in the case where the number of name resolution requests is greater than a first predetermined number, and the determination of step S702 is performed in the case where the number of requests is not greater than the first predetermined number but is greater than a second predetermined number (<(the first predetermined number)). In these cases, the domain name (and the corresponding IP address) is cached if the time from the request to the response is greater than the predetermined time.

Alternatively, the determination of step S701 may be performed in the case where it is determined in step S702 that the time from the name resolution request to the response is greater than the predetermined time. In detail, the number of name resolution requests may be counted for the domain name only in the case where the time up to the response is greater than the predetermined time, with the domain name being cached in the case where the number of requests is greater than the predetermined number. Here, the domain name may be registered in the cache without the determination on the number of requests in the case where the time up to the response is greater than the first predetermined time, as in the above-mentioned case. The number of name resolution requests may be determined in the case where the time is not greater than the first predetermined time but is greater than a second predetermined time (<(the first predetermined time)).

Thus, according to this embodiment, the DNS client reserves memory only for the above-mentioned predetermined domain name length for each domain, and caches only each domain name not greater than the predetermined length and its corresponding IP address. In this way, the DNS client can prevent waste of storage space in temporary storage of name resolution results. Regarding each domain name greater than the predetermined length, for example, the DNS client stores the domain name if the domain is frequently accessed, the name resolution of the domain takes a long time, or the domain is pre-registered. This improves the efficiency of name resolution. It is therefore possible to suppress the issuance of an unnecessary name resolution request, and prevent waste of name resolution-related resources such as communication resources of the entire system.

According to the present invention, waste of storage space in temporary storage of name resolution results can be prevented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-080493, filed Apr. 9, 2014, which is hereby incorporated by reference herein in its entirety.

What is claimed is:

1. A communication apparatus comprising:
one or more memories; and
one or more computers for causing the communication apparatus to:
request name resolution, by designating a domain name, to a domain name system (DNS) server,
receive a response to the request, which includes address information corresponding to the designated domain name, from the DNS server,
determine whether or not a length of the designated domain name is longer than a predetermined length;
in a case where it is not determined that the length of the designated domain name is longer than the predetermined length, cause the one or more memories to store the designated domain name and the address information in association with each other, and to perform communication based on the address information that is included in the response; and
in a case where it is determined that the length of the designated domain name is longer than the predetermined length, even in a case where the response is received, cause the one or more memories not to store the designated domain name and the address information in association with each other, and to perform communication based on the address information that is included in the response.

2. The communication apparatus according to claim 1, wherein the one or more computers further cause the communication apparatus to:
count the number of times the name resolution in which a first domain name is designated has been requested, and
in the case where the counted number of times is greater than a predetermined number, cause the one or more memories to store the first domain name and the address information corresponding to the first domain name in association with each other, regardless of the length of the first domain name.

3. The communication apparatus according to claim 2, wherein the one or more computers further cause the communication apparatus to hold the number of times and information generated by shortening the first domain name, in association with each other.

4. The communication apparatus according to claim 1, wherein the one or more computers further cause the communication apparatus to:
measure a time from when the name resolution in which a second domain name is designated is requested to when the response is received, and
in the case where the time is greater than a predetermined time, cause the one or more memories to store the second domain name and the address information corresponding to the second domain name in association with each other, regardless of the length of the second domain name.

5. The communication apparatus according to claim 1, wherein the one or more computers further cause the communication apparatus to:
for a domain name that is pre-registered, cause the one or more memories to store the pre-registered domain name and the address information corresponding to the pre-registered domain name in association with each other, regardless of the length of the pre-registered domain name.

6. The communication apparatus according to claim 1, wherein a first area in the one or more memories for storing a domain name is predefined.

7. The communication apparatus according to claim 6, wherein a second area different from the first area is reserved in the one or more memories, as an area for storing a domain name that has a length longer than the predetermined length.

8. A control method for a communication apparatus that comprises one or more memories, the control method comprising:
- requesting name resolution, by designating a domain name, to a domain name system (DNS) server;
- receiving a response to the request, which includes address information corresponding to the designated domain name, from the DNS server;
- determining whether or not a length of the designated domain name is longer than a predetermined length;
- in a case where it is not determined that the length of the designated domain name is longer than the predetermined length, causing the one or more memories to store the designated domain name and the address information in association with each other, and performing communication based on the address information that is included in the response; and
- in a case where it is determined that the length of the designated domain name is longer than the predetermined length, even in a case where the response is received, causing the one or more memories not to store the designated domain name and the address information in association with each other, and performing communication based on the address information that is included in the response.

9. A non-transitory computer-readable storage medium storing a computer program for causing a computer included in a communication apparatus that comprises one or more memories to execute:
- requesting name resolution, by designating a domain name, to a domain name system (DNS) server;
- receiving a response to the request, which includes address information corresponding to the designated domain name, from the DNS server;
- determining whether or not a length of the designated domain name is longer than a predetermined length;
- in a case where it is not determined that the length of the designated domain name is longer than the predetermined length, causing the one or more memories to store the designated domain name and the address information in association with each other, and performing communication based on the address information that is included in the response; and
- in a case where it is determined that the length of the designated domain name is longer than the predetermined length, even in a case where the response is received, causing the one or more memories not to store the designated domain name and the address information in association with each other, and performing communication based on the address information that is included in the response.

10. The communication apparatus according to claim 6, wherein the first area has a size equivalent to a result of multiplying the predetermined length by a predetermined number.

* * * * *